Dec. 21, 1965  J. N. AKERS  3,224,948
APPARATUS FOR DISTILLING NON-POTABLE
WATER TO PRODUCE POTABLE WATER
Filed March 19, 1963  3 Sheets-Sheet 1

John N. Akers
INVENTOR.

BY
Attorneys

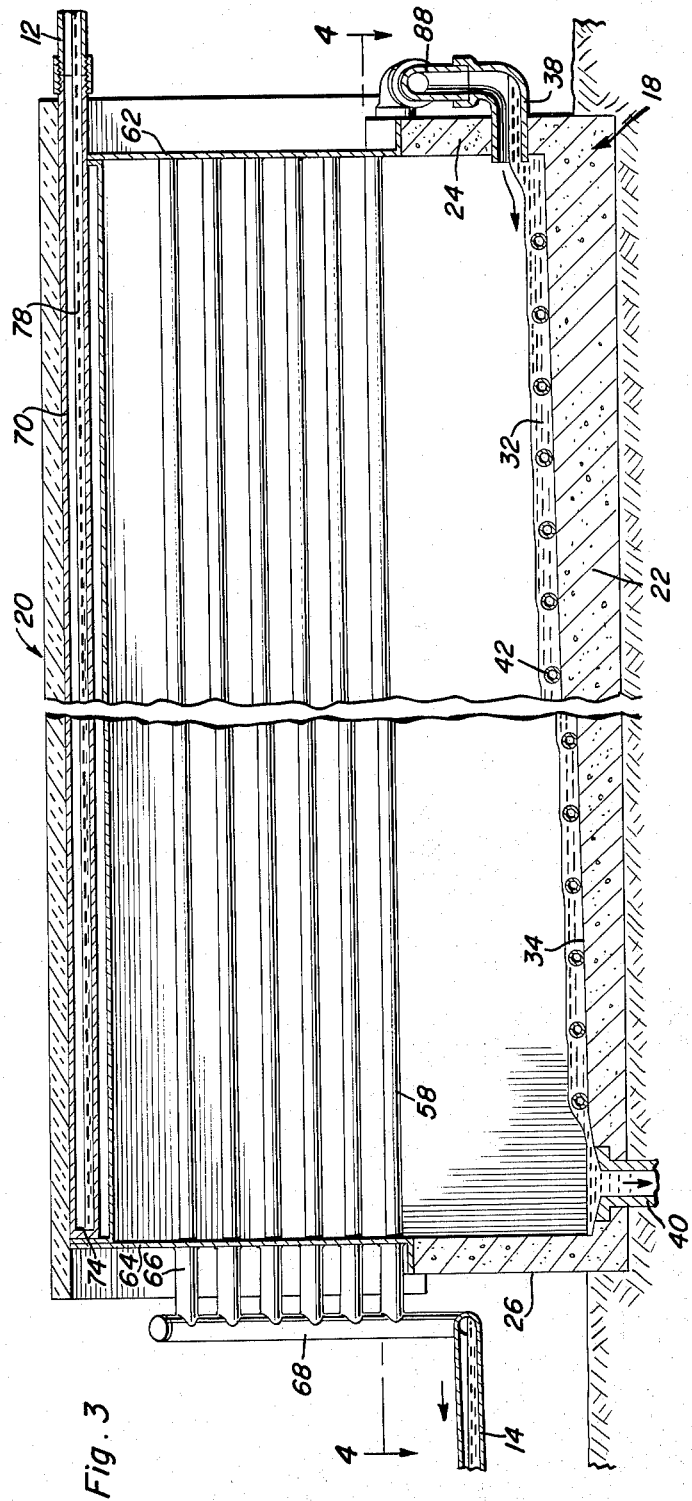
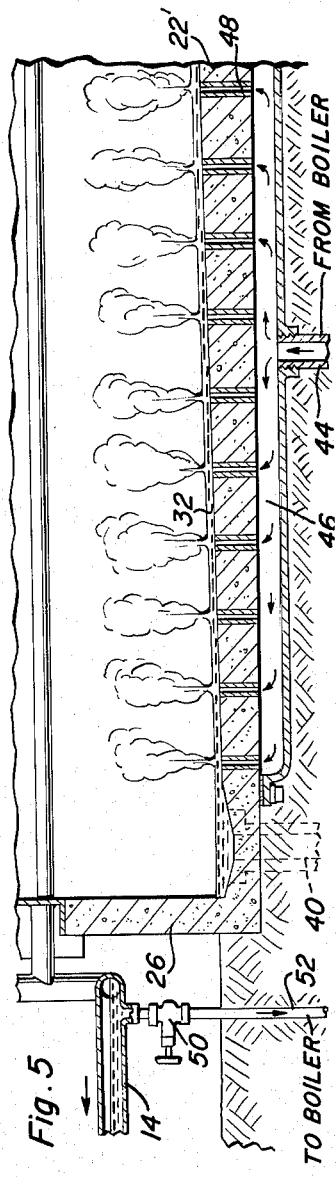
Fig. 3
Fig. 5
John N. Akers
INVENTOR.

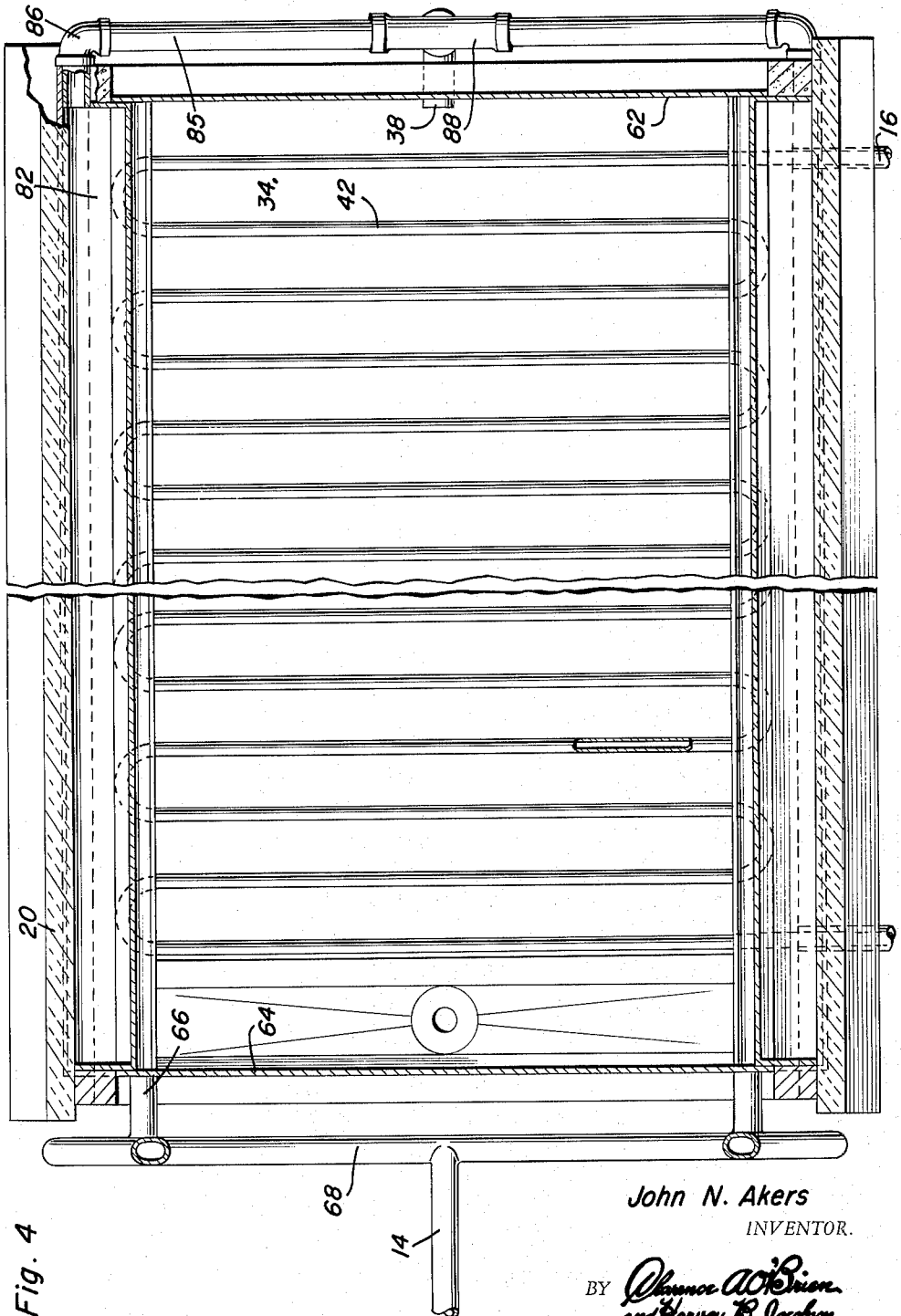

United States Patent Office 3,224,948
Patented Dec. 21, 1965

3,224,948
APPARATUS FOR DISTILLING NON-POTABLE
WATER TO PRODUCE POTABLE WATER
John N. Akers, 2011 N. Cascade, Colorado Springs, Colo.
Filed Mar. 19, 1963, Ser. No. 266,350
1 Claim. (Cl. 202—192)

This invention relates to apparatus for recovering drinking water from a source of non-potable water such as saline water and in general to apparatus for distilling liquids.

The apparatus of the present invention provides an economical method for obtaining purified or distilled water from sea water or the like utilizing any available source of heat including heat accumulated from solar energy by a device such as disclosed in my copending application Serial No. 266,349, filed March 19, 1963, now abandoned, as well as from other sources of heat. It is therefore a primary object of the present invention to provide apparatus for distilling water in a significantly more economical fashion.

In accordance with the foregoing object, the apparatus of the present invention involves an elongated channel or basin structure through which water may flow for a substantial distance. A source of relatively low intensity heat that may be available for the purpose, may therefore be utilized for evaporating relatively large quantities of water as it flows through the elongated channel structure from an inlet end to a discharge end from which a concentrate may be removed as either a waste product or a useful by-product. The water before being admitted to the channel structure is preheated so as to reduce the amount of heat energy necessary to evaporate the water. Preheating of the water is effected by heat exchange with a condensing roof structure which encloses the channel structure so as to form thereabove an evaporation chamber with the vapors condensing on the inside surface of the roof structure. Accordingly, parallel spaced troughs are mounted on the inside condensing surface of the roof structure so as to collect and direct the condensate toward an outlet from which distilled water may be drawn. The water to be distilled is therefore conducted through a conduit from which it is distributed in such a manner as to bathe the outside of the surface-conducting roof structure in order to maintain the condensing surface thereof at condensing temperature. Thus, the water supplied at ambient temperature will be elevated by virtue of the heat transferred thereto from the vapor condensing structure, after which the preheated water is supplied to the inlet end of the channel structure as aforementioned.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a longitudinal sectional view taken substantially through a plane indicated by section line 3—3 in FIGURE 1.

FIGURE 4 is a sectional view taken substantially through a plane indicated by section line 4—4 in FIGURE 3.

FIGURE 5 is a partial longitudinal sectional view showing a modified form of water distilling structure.

Figure 1:
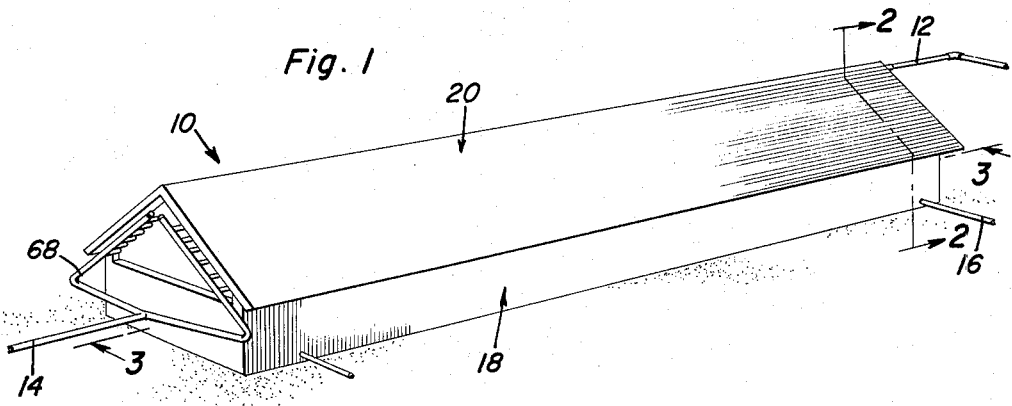
FIGURE 1 is a perspective view of a water distilling structure constructed in accordance with the principles of the present invention.

Referring now to the drawings in detail, it will be observed from FIGURE 1, that the structure generally referred to by reference numeral 10 provides the facilities for distilling water derived from some source of saline water for example through the inlet pipe 12, so as to deliver distilled water through the outlet pipe 14. Also associated with the structure 10 will be a source of heat (not shown) from which heat energy may be supplied through the conduits 16 connected to the structure 10. The heat energy may therefore be carried by a fluid medium and derived from sources such as the solar energy accumulating device disclosed in the copending application aforementioned or from any other heat generating equipment. It will also be appreciated, that the length of the structure 10 will be substantially greater than the proportions indicated in FIGURE 1, the length being dependent upon various factors such as the heat level of the heating medium supplied to the structure by the conduit 16 and the ambient temperature of the source of water supplied to the structure by the inlet pipe 12.

Figure 2:
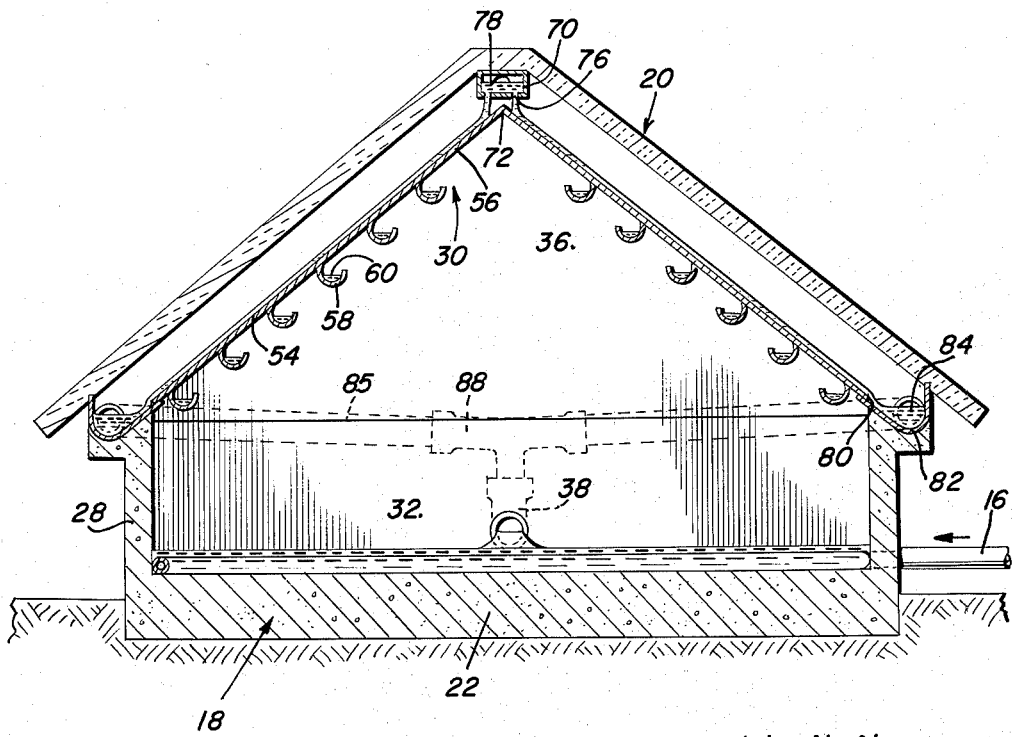
FIGURE 2 is a transverse sectional view taken substantially through a plane indicated by section line 2—2 in FIGURE 1.

Referring now to FIGURES 2, 3 and 4 in particular, it will be observed that the structure 10 is formed by an elongated channel structure 18 supported on the ground and made of a non-porous material such as concrete for conducting water therethrough. Enclosing the channel structure 18 so as to prevent the escape of vapor therefrom, is an outer roof structure generally referred to by reference numeral 20. The channel structure 18 therefore includes a horizontal bed 22 having a slight incline from the end wall 24 at its inlet portion toward the end wall 26 at its outlet portion as more clearly seen in FIGURE 3. The longitudinal sides of the bed 22 are provided with parallel spaced side walls 28 as more clearly seen in FIGURE 2 so as to support thereabove the outer roof structure 20, and an inner surface condensing roof assembly generally referred to by reference numeral 30. It will therefore be apparent, that preheated water 32 flowing along the upper surface 34 of the channel bed 22, will be vaporized so that the rising vapors may condense upon the surface condensing assembly 30 which forms an elongated evaporation chamber 36 above the channel structure. The preheated water 32 is therefore supplied to the inlet end portion of the channel structure by means of the conduit section 38 mounted centrally of the end wall 24. As the preheated water 32 flows toward the discharge end portion, a substantial quantity thereof will be evaporated so that a concentrate or water highly concentrated with salts will be discharged through the discharge conduit 40 located at the discharge end portion of the channel structure.

As more clearly seen in FIGURES 3 and 4, heating coils 42 are supported on the upper surface 34 of the channel bed 22 in order to conduct the heating medium therethrough in heat transfer relation to the preheated water 32 flowing along the channel bed. The coils 42 will accordingly be spaced a proper distance along the elongated channel structure so that the heating medium may be circulated for a substantial distance in heat transfer relation to the flowing water in order to elevate the temperature thereof to a sufficient degree for evaporation. As hereinbefore indicated, the heating coils 42 may therefore be connected by the conduit 16 to any suitable heat generating source which may include the aforementioned solar energy accumulating device or steam generating facilities. As an alternative heating means, heat may be derived from a steam generating plant supplying steam under pressure through a conduit 44 as shown in FIGURE 5. Thus, the steam under pressure will be supplied to a manifold 46 disposed below the bed 22′ of the channel structure which is provided with a plurality of spaced passages 48 through which live steam may be directly injected to the preheated water 32 flowing toward the concentrate discharge 40. In this manner, the boiler scale problem usually associated with the use of heating coils or tubes may be eliminated and more rapid evaporation of the water 32 effected. Thus, in the modified form of apparatus as shown in FIGURE 5, the outlet conduit 14′ may be connected through a control valve 50 to a feed water return pipe 52 for supplying the steam generator with a portion of the distilled water being produced. A controlled recycling of water may thereby be effected in connection with the apparatus as disclosed in FIGURE 5 inasmuch as water is being introduced to the evaporation chamber by injecting the live steam into the preheated water 32.

The surface condensing assembly 30 which encloses the evaporation chamber 36 above the channel structure, is formed by a pair of interconnected panels 54 as more clearly seen in FIGURE 2 so as to bridge the side walls 28 of the channel structure on which the panels 54 are supported. The panels 54 will be made of a heat conductive material such as sheet metal so that the inner surface 56 thereof will constitute a condensing surface on which the rising vapors from the water 32 will condense. A plurality of parallel spaced gutters or troughs 58 will therefore be connected to and suspended from the inner surface 56 of the panels 54 in order to collect the condensate 60 therein which forms on the inner surface 56 and rolls downwardly along the panels. It will also be observed from FIGURE 3, that all of the parallel spaced troughs 58 are slightly inclined downwardly from the end supporting plate 62 toward the end supporting plate 64 so as to produce a gravity induced flow of condensate. A plurality of branch pipes 66 will therefore be connected to the respective condensate collecting gutters 58 at the end supporting plate 64 so as to direct the condensate into the converging branch pipes 68 connected to the outlet conduct 14 from which distilled water may be drawn. It will be apparent, that the condensing surfaces 56 of the panels 54 must be maintained at a low enough temperature so as to continuously condense the rising vapors necessary to collect the condensate 60 within the collecting gutters 58. Accordingly, facilities are provided for removing the heat transferred to the condensing surfaces of the panels 54 given up by the condensing water collecting thereupon.

It will therefore be observed, from FIGURES 2 and 3, that the inlet conduit 12 is connected to an elongated conduit 70 secured to the outer roof assembly 20 and closely spaced above the vapor condensing panels 54 at the apex 72. The end 74 of the conduit 70 opposite the inlet end to which the inlet conduit 12 is connected, is closed. Also provided on the lower side of the conduit 70, are two parallel lines of spaced apertures 76 from which the inlet water 78 is discharged for flow downwardly on the outside surfaces of the panels 54. Accordingly, the inlet water 78 at ambient temperature will be effective to continuously bathe the outer surfaces of the panels 54 in order to maintain these panels at a condensing temperature. It will also be apparent, that as the inlet water flows downwardly along the side panels 54, acting as a coolant, it will be elevated in temperature by transfer of heat thereto from the condensing water in the evaporation chamber 36. Escape of vapor rising from the water bathing the panels 54 will be prevented by the outer roof panels 20 on which such vapor may condense. If such condensation is of sufficient quantity it may be conducted directly to outlet 14 by any suitable means not shown. However, most of the cooling water is merely preheated. Accordingly, connected to the lower edge portions 80 of the panels 54 and supported on top of the side walls 28, are a pair of parallel collecting troughs 82 within which preheated water 84 is collected at a temperature elevated above the ambient temperature of the inlet water 78. The collecting troughs 82 will therefore be slightly inclined downwardly toward the inlet end portion of the channel structure so as to produce a gravity induced flow of preheated water 84. Thus, as more clearly seen in FIGURE 4, the preheated water will be directed into downwardly converging conduit branches 85 connected to the ends of the collecting troughs 82 by the elbow sections 86. The preheated water will therefore flow through the converging branches 85 toward the T-coupling 88 and into the inlet section 38 for supply to the inlet end portion of the channel structure as aforementioned.

From the foregoing description, the construction, operation and utility of the distilling apparatus will be apparent. It will therefore be appreciated, that the structure made in accordance with the principles of the present invention will provide facilities for economically distilling large quantities of water from any available source of heat, utilizing the source of water to be distilled to advantage by distribution thereof over the condensing assembly so as to maintain the condensing temperature thereof and at the same time preheating the water before admission to the elongated channel structure for subsequent evaporation. The structure made in accordance with the foregoing will therefore be relatively simple and economical and will also be continuously operative and involve minimum maintenance problems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

Apparatus for distilling non-potable water to produce potable distillate water at ambient temperature comprising, an elongated distillation chamber having opposite inlet and outlet ends, said chamber comprising a channel bed having a horizontally inclined surface connecting said inlet and said outlet ends for the flow of water to be distilled through said distillation chamber, means for heating said channel bed for evaporating water flowing over said inclined surface, condenser means supported on said distillation chamber, said condenser comprising a covering roof structure including a pair of vertically inclined panel members which are interconnected at an apex portion to bridge said channel bed, said panels being heat conductive and constituting a condensing surface on the inner side thereof, a plurality of parallel spaced troughs suspended from said inner surface for collecting condensate which forms on the inner side surface, said troughs being inclined downwardly and connected to a converging manifold for inducing gravity flow of distillate water collected in said troughs for recovery of the same, means for flowing water to be distilled over said roof structure and comprising a feed inlet conduit connected to an elongated conduit secured to the apex portion of said roof structure, said elongated conduit having spaced apertures for discharging water at ambient temperature onto the outer surface of said roof structure to bathe the same and maintain the said outer surface at a condensing temperature and to preheat the water flowing thereover, means comprising a pair of parallel arranged troughs for collecting the preheated water after flowing over said roof structure and passing the same downwardly to said distillation chamber inlet, and discharge conduit means connected to said distillation chamber outlet.

References Cited by the Examiner

UNITED STATES PATENTS

| | | | |
|---|---|---|---|
| 488,664 | 12/1892 | Reuber et al. | 202—192 |
| 491,028 | 1/1893 | Thomas et al. | 202—191 |
| 988,661 | 4/1911 | Power | 202—194 X |
| 1,076,410 | 10/1913 | Dunham | 202—194 |
| 2,398,842 | 4/1946 | Morse | 202—189 |
| 2,722,507 | 11/1955 | Blundell et al. | 202—234 |
| 3,080,302 | 3/1963 | Rogers et al. | 202—234 X |

NORMAN YUDKOFF, *Primary Examiner.*